United States Patent
Aihara

Patent Number: 5,954,914
Date of Patent: Sep. 21, 1999

[54] WEB LAMINATION DEVICE

[75] Inventor: Kintaro Aihara, Chiba, Japan

[73] Assignee: Nippon Petrochemicals Company, Limited, Tokyo, Japan

[21] Appl. No.: 08/945,323

[22] PCT Filed: Feb. 23, 1996

[86] PCT No.: PCT/JP96/00416

§ 371 Date: Oct. 22, 1997

§ 102(e) Date: Oct. 22, 1997

[87] PCT Pub. No.: WO97/30842

PCT Pub. Date: Aug. 28, 1997

[51] Int. Cl.[6] .............. B32B 5/08; B32B 31/10
[52] U.S. Cl. .............. 156/361; 156/555; 156/582
[58] Field of Search ..................... 156/361, 555, 156/580, 581, 582, 583.1

[56] References Cited

U.S. PATENT DOCUMENTS

| | | | |
|---|---|---|---|
| 4,255,227 | 3/1981 | Hill | 156/555 |
| 4,310,365 | 1/1982 | Elliott et al. | 156/55 |
| 5,290,377 | 3/1994 | Aihara et al. | 156/229 |
| 5,609,714 | 3/1997 | Whiteside et al. | 156/387 |

FOREIGN PATENT DOCUMENTS

| | | |
|---|---|---|
| 55-12647 | 9/1980 | Japan . |
| 57-30368 | 6/1982 | Japan . |
| 4-82953 | 3/1992 | Japan . |
| 4-211939 | 8/1992 | Japan . |
| 4-267149 | 9/1992 | Japan . |
| 4-286644 | 10/1992 | Japan . |

*Primary Examiner*—James Sells
*Attorney, Agent, or Firm*—Burns, Doane, Swecker & Mathis, L.L.P.

[57] ABSTRACT

A web lamination device for laminating a transverse web, having longitudinal fibrous elements extending generally transverse to the longitudinal conveying direction and opposite selvages, with a longitudinal web having longitudinal fibrous elements extending generally parallel to the longitudinal conveying direction at a laminating roll. The web lamination device includes skew correction means capable of contacting at least one of selvages of the transverse web running to the laminating roll of the web lamination device at a predetermined speed, for correcting the skew of the transverse web. The skew correction means includes a drive roll capable of selectively contacting one of the selvages of the transverse web, to drive one of selvages faster or slower than the conveying speed, when skew occurs in the transverse web.

12 Claims, 7 Drawing Sheets

WEB LAMINATION DEVICE

TECHNICAL FIELD

The present invention relates to a web lamination device for laminating a transverse web having widthwise fibrous elements extending generally transverse to the longitudinal conveying direction with a longitudinal web having lengthwise fibrous elements extending generally parallel to the longitudinal conveying direction.

BACKGROUND ART

A web lamination device of the above described type is disclosed, for example, in Japanese Unexamined Patent Publication (Kokai) No. 4-82953 and No. 4-267149. The conventional device of this type is illustrated in FIG. 9. In FIG. 9, a longitudinal web 1 has longitudinal fibrous elements 10, and a transverse web 2 has transverse fibrous elements 9. The transverse web 2 also has selvages 3 for conveying the web. The longitudinal web 1 and the transverse web 2 are respectively fed to a laminating roll 5 and laminated with each other at the laminating roll 5.

Prior to reaching the laminating roll 5, the transverse fibrous elements 9 of the transverse web 2 are liable to slacken, as shown in FIG. 10, and a width of the transverse web 2 is reduced depending on the slack, as shown in FIG. 11. Accordingly, the transverse web 2 is guided by a pair of cloth guiders 8 or the like arranged directly upstream of the laminating roll 5, to introduce the transverse web 2 to the laminating roll 5 under lateral tension.

On the other hand, as shown in FIG. 9, the longitudinal web 1 having a predetermined width is first introduced to an introduction roll 4 to reverse its course to the laminating roll 5, and is overlaid on the transverse web 2 introduced to the laminating roll 5. Therefore, the transverse web 2 is pressed onto the laminating roll 5 due to the longitudinal tension of the longitudinal web 1. The longitudinal web 1 and/or the transverse web 2 have an adhesive layer on at least one surface thereof to be in contact with the other, which is heated while the laminated webs run around the outer circumference of the laminating roll 5, and the longitudinal web 1 and the transverse web 2 are adhered with each other to form a laminated product 7.

The transverse fibrous elements 9 in the transverse web 2 must be regularly arranged in the transverse direction prior to being overlaid with the longitudinal web 1, as shown in FIG. 11. However, the transverse fibrous elements 9 are liable to skew, as illustrated in FIG. 12. This is because the opposite selvages 3 are not strictly homogeneous to each other. That is, since the selvages 3 contribute to transport the transverse web 2 but the transverse fibrous elements 9 does not contribute to transport the transverse web 2, it is necessary to draw the selvages 3 forward to introduce the transverse web 2 into the laminating roll 5, which causes a significant tension in the selvages 3.

If the cross-sectional area and/or the stretching characteristic of one of the selvages 3, 3 do not strictly coincide with those of the other, there may be a difference in expansion between the selvages. Even if this difference is slight, it accumulates with time, and one of ends of the transverse fibrous elements 9 at which the selvage is easily extensible is delayed, so the transverse fibrous elements 9 are skewed. When the transverse fibrous elements 9 are skewed to a certain extent, the transverse fibrous elements 9 themselves operate to pull the delayed selvage. Thereby the tension load applied to the delayed selvage is reduced and the selvage does not expand furthermore, equilibrium being established so that the web runs while maintaining the transverse fibrous elements in the skewed state.

If the transverse fibrous elements 9 are skewed, the transverse fibrous elements 9 do not naturally intersect the longitudinal fibrous element 10 at a right angle, which does not result in a desired product. Accordingly, it is necessary to avoid skewing of the transverse web, and if skewing occurs, it should be immediately corrected. However, it is difficult to prevent skewing by homogenizing the selvages because there is a possible limit in this homogenization. Accordingly, there is a problem that once skewing occurs, it is necessary to stop and restart the production line, which significantly disturbs productivity.

SUMMARY OF THE INVENTION

An object of the present invention is to solve the above problem in the prior art and to provide a web lamination device for exactly laminating a transverse web and a longitudinal web while maintaining transverse fibrous elements of the transverse web accurately in the transverse direction as far as possible.

The web lamination device according to the present invention comprises a laminating roll for laminating a transverse web having transverse fibrous elements extending generally transverse to the longitudinal conveying direction and opposite selvages with a longitudinal web having longitudinal fibrous elements extending generally parallel to the longitudinal conveying direction, and skew correction means to be in contact with at least one of the selvages of the transverse web conveyed to the laminating roll at a predetermined speed for correcting skewing of the transverse web.

In this structure, when skewing occurs in the transverse fibrous elements, the relatively delayed selvage is driven faster than the advancing selvage, the relatively advancing selvage is slightly braked, by the skew correction means, or these two measures are used together, whereby skewing of the transverse fibrous elements is corrected.

Preferably, the skew correction means comprises a first running speed control means for controlling a running speed of one of the selvages of the transverse web and a second running speed control means for controlling a running speed of the other of the selvages of the transverse web. The first and second running speed control means preferably consist of a first and second drive rolls capable of being in contact with the selvages of the transverse web, respectively.

In a preferred aspect, a first nip roll is provided in association with the first drive roll and a second nip roll is provided in association with the second drive roll, and further, a first actuator means is provided for relatively moving the first drive roll and the first nip roll toward and away from each other, and a second actuator means is provided for relatively moving the second drive roll and the second nip roll toward and away from each other. The first drive roll may be driven by a first motor, and the second drive roll may be driven by a second motor.

Preferably, in this case, when the skew correction is carried out, each of the first actuator and the second actuator operates to move the drive roll and the associated nip roll toward each other to nip the selvage of the transverse web between them so that the selvage runs at the same speed as the peripheral speed of the drive roll. On the other hand, when no skew correction is carried out, each of the first and second actuator means operates to move the associated drive roll and nip roll away from each other to release the transverse web from the nip between the drive roll and the nip roll.

According to another preferred aspect, a single motor is commonly provided for driving the first and second drive rolls, and a single nip roll is commonly provided to the first and second drive roll, wherein one end portion of the common nip roll confronts the first drive roll and the other end portion of the common nip roll confronts the second drive roll. A first actuator means is provided for moving the one end portion of the common nip roll and the first drive roll toward and away from each other, and a second actuator means is provided for moving the other end portion of the common nip roll and the second drive roll toward and away from each other.

Preferably, in this case, when the skew correction is carried out, each of the first and second actuator means move the drive roll and the associated end portion of the common nip roll toward each other to nip the selvage of the transverse web between them so that the selvage runs at the same speed as the peripheral speed of the drive roll. On the other hand, when no skew correction is carried out, the drive roll and the associated nip roll are moved away from each other to release the transverse web from the nip between the drive roll and the nip roll.

The skew correction means may comprise a running speed control means for controlling a running speed of one of the selvages of the transverse web. In this aspect, the running speed control means preferably comprises a drive roll capable of accelerating or decelerating the running speed of one of the selvages of the transverse web relative to that of the other selvage.

Also, the running speed control means (or the first and second running speed control means) may be a braking means for braking the running of the selvage of the transverse web.

BRIEF DESCRIPTION OF THE DRAWINGS

The present invention will be described in more detail with reference to the preferred embodiments illustrated in the drawings, in which.

BEST MODES FOR CARRYING OUT THE INVENTION

Figure 1:
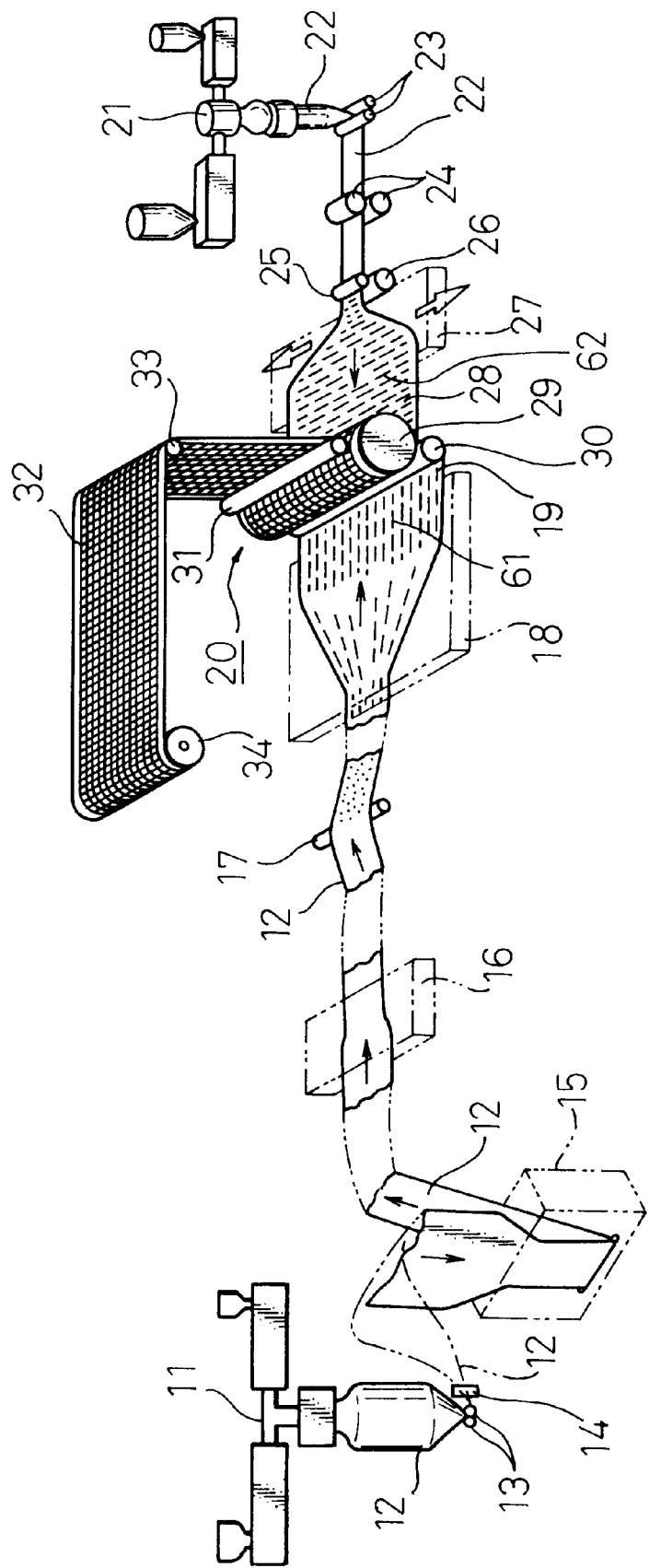
FIG. 1 is a perspective view of a laminate producing apparatus including a web lamination device according to the first embodiment of the present invention.

FIG. 1 shows a laminate producting apparatus including a web lamination device according to the first embodiment of the present invention.

In FIG. 1, on the left side of a web lamination device 10, an extruder 11 for producing a longitudinal web, which is supplied with high density polyethylene and low density polyethylene and extrudes the same as a tubular film 12, is located. The extruded tubular film 12 has a three layered structure consisting of outer and inner layers of low density polyethylene and an intermediate layer of high density polyethylene.

The tubular film 12 is folded into a sheet form by a pair of pinch rolls 13 and then cut and opened to form a wide width sheet by a cutter unit 14. Next, the film 12 in the form of a wide sheet is stretched in a hot bath at a predetermined stretch ratio in the longitudinal direction by a primary stretch unit 15. The width of the film 12 is reduced depending on the stretch ratio. Then, the film 12 is further stretched in a hot air at a predetermined stretch ratio by a secondary stretch unit 16, during which the width of the film 12 is similarly reduced depending on the stretch ratio.

Thereafter, the stretched film 12 is split in the longitudinal direction by a splitting tool 17. Thereby, the split film 12 is converted into a sheet having slits in the network structure. Then, the split film 12 is widened to a predetermined width in the transverse direction by a widening unit 18, to form a longitudinal web 19 mainly comprised of longitudinal fibrous elements 61 extending in the longitudinal direction. This longitudinal web 19 is heated by a not shown heat treatment roll to release a strain therefrom, and thereafter introduced between a laminating roll 29 of a web lamination apparatus 20 and an introduction roll 30.

On the right side of the web lamination apparatus 10, an extruder 21 is provided for producing a transverse web, which is supplied with high density polyethylene and low density polyethylene and extrudes the same as a tubular film 22 having a double layered structure consisting of an outer layer of low density polyethylene and an inner layer of high density polyethylene. Then, the tubular film 22 is folded into a sheet form by a pair of pinch rolls 23 to form a four layered structure consisting of outer and inner layers of low density polyethylene and intermediate two layers of high density polyethylene.

The film 22 is pressed by a pair of pinch rolls 24. Thereby, the intermediate two layers of high density polyethylene are united to one layer due to blocking, and thus, the film 22 is of a three layered structure consisting of outer and inner layers of low density polyethylene and an intermediate layer of high density polyethylene. Next, the film 22 is introduced into between a slitter 25 and an anvil roll 26. A number of slits extending in the transverse direction are formed in a staggered manner in the film 22, except for selvage portions thereof, by the slitter 25. Then, the film 22 is stretched in the transverse direction by a transverse stretching unit 27 to form a transverse web 28 mainly comprised of a number of transverse fibrous elements 62 in the network structure extending in the transverse direction and selvages 57 (shown in FIG. 3) on the opposite lateral ends of the web 28 for the transportation thereof. The transverse web 28 is introduced between the laminating roll 29 and the introduction roll 30 of the web lamination apparatus 10.

Figure 3:
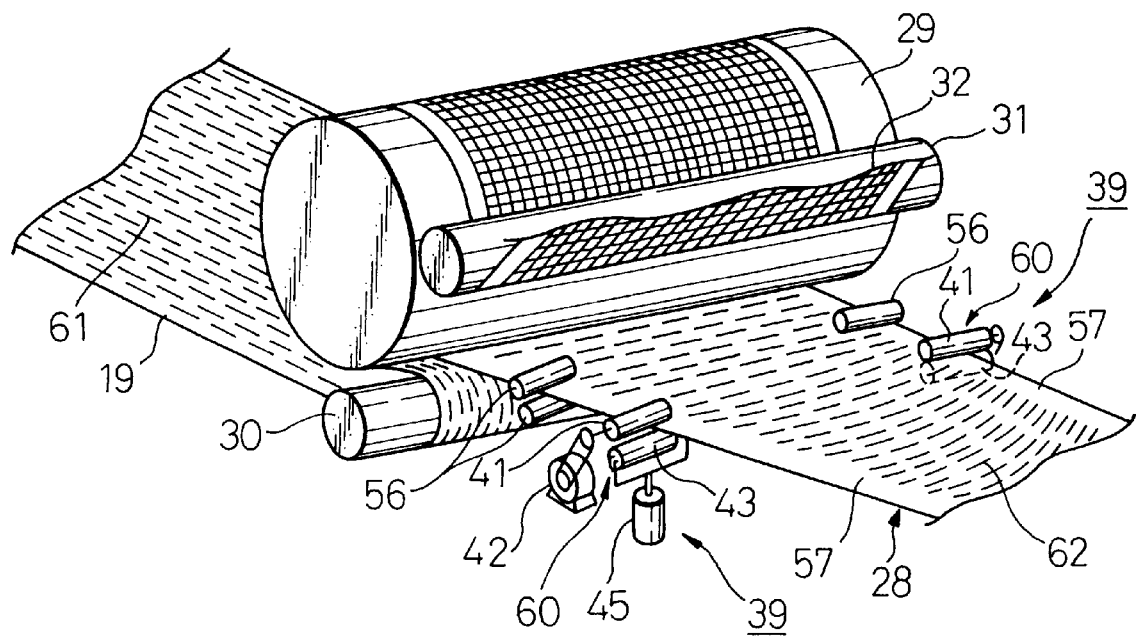
FIG. 3 is an enlarged perspective view of the web lamination device of Figure.

As shown in FIG. 3, the web lamination apparatus 10 includes skew correction devices 39 in a transportation path for the transverse web 28 upstream of the laminating roll 29. The transverse web 28 is introduced between the laminating roll 29 and the introduction roll 30 in the condition tensioned by cloth guiders 56 or the like, after any skew is corrected by the skew correction devices 39.

When the longitudinal web 19 and the transverse web 28 are introduced between the laminating roll 29 and the introduction roll 30, the longitudinal web 19 acts to press the transverse web 28 onto the laminating roll 29, and the overlaid webs are compressed by a delivery roll 31. Thus, a laminate 32 is obtained wherein the longitudinal fibrous elements 61 and the transverse fibrous elements 62 extend in the longitudinal and transverse directions, respectively. This laminate 32 is taken up by a winding unit 34.

Figure 2:
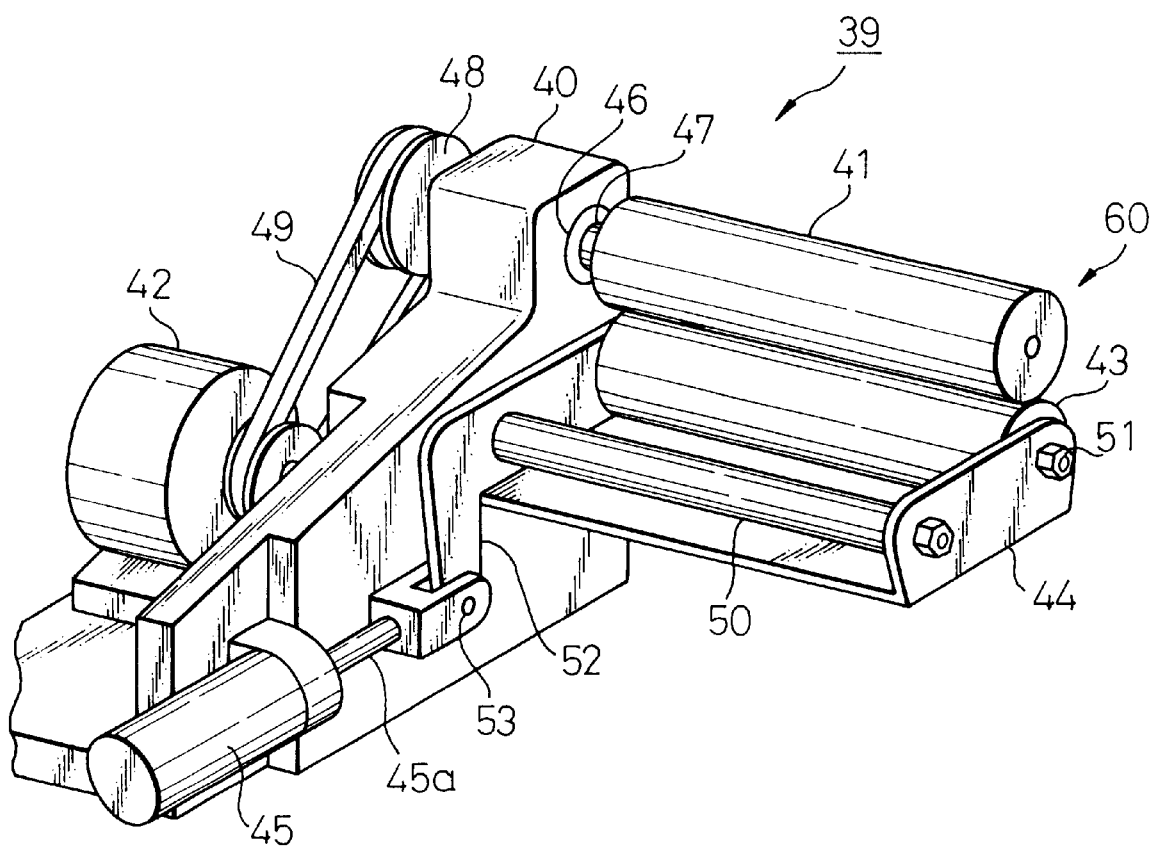
FIG. 2 is a perspective view of a skew correction device.

With reference to FIGS. 2 and 3, the skew correction devices 39 for the transverse web 28 will be described in detail. The skew correction devices 39 include running speed control means 60 able to contact the opposite selvages 57 of the transverse web 28, each running speed control means comprising a drive roll 41 and a nip roll 43. FIG. 2 is a perspective view concretely illustrating the arrangement of one of the running speed control means 60. As shown in FIG. 2, the skew correction device 39 comprises a frame 40, a drive roll 41 mounted to the frame 40, a motor 42 for driving the drive roller 41, a nip roll 43, a nip roller holder 44, a pneumatic cylinder 45 for pivotally driving the nip roll holder 44, and others.

The drive roll 41 is secured to a rotary shaft 47 supported by a bearing 46 provided in the frame 40. A pulley 48 is mounted to the other end of the rotary shaft 47 and the drive roll 41 is driven for rotation by the motor 42 via the pulley 48 and a belt 49.

The nip roll holder 44 has a U-shaped cross-section and is rotatably supported by a supporting shaft 50 fixed to the frame 40. The nip roll 43 is rotatably mounted in parallel to the drive roll 41 to a stationary shaft 51 provided on the nip roll holder 44. An L-shaped lever 52 is provided on one side of the nip roll holder 44, and the free end of the L-shaped lever 52 is engaged with a tip end of a piston rod 45a of a pneumatic cylinder 45 fixed to the frame 40 via a pin 53. Accordingly, the nip roll 43 is driven to move away and from the drive roll 41 by the action of the pneumatic cylinder 45.

The operation of this embodiment thus structured will be described with reference to FIG. 3.

The transverse web 28 prepared in the stretch process is pulled in the transverse direction by the cloth guiders 56, 56 nipping the selvages 57 immediately before entering the laminating roll 29, so that it is laterally tensioned and pressed onto the laminating roll 29 by the longitudinal web 19 introduced via the introduction roll 30.

The running speed control means 60 of the skew correction devices 39 disposed upstream of the cloth guiders 56, 56 are normally at a non-operative position. That is, each nip roll 43 is at a position away from the drive roll 41 so that the selvages 57 of the transverse web 28 are released from the nip between the nip roll 43 and the drive roll 41.

If the operator sees the skew of the transverse web 28, the pneumatic cylinder 45 of the running speed control means on the side corresponding to the delayed selvage 57 is operated to move the nip roll 43 toward the drive roll 41 and thus nip the selvage 57 of the transverse web 28 between the drive roll 41 and the nip roll 43. The motor 42 is controlled so that the peripheral speed of the drive roll 41 is higher than the running speed of the delayed selvage 57 and thus the delayed selvage 57 is accelerated to catch up with the advanced selvage 57. Thus, it is possible to correct the skew of the transverse web 28. Accordingly, the transverse web 28 is correctly overlaid on the longitudinal web 19 while maintaining the transverse fibrous elements 62 of the transverse web 28 in the transverse direction as far as possible.

Since the selvages 57 of the transverse web 28 are not stretched in the transverse direction, the thickness thereof is larger than that of the transverse fibrous portion 62. Accordingly, when the transverse fibrous portions 62 reach the drive roll 41 and the nip roll 43, the portions 62 are not substantially nipped thereby and, therefore, the fiber elements are not wrapped around the rolls.

While the delayed selvage 57 is accelerated in the above embodiment, the present invention is not limited thereto. The pneumatic cylinder 45 of the running speed control means 60 on the advanced side of the transverse web 28 may be operated to nip the advanced selvage 57 between the drive roll 41 and the nip roll 43, wherein the motor 42 is controlled to decelerate the drive roll 41 so that the peripheral speed of the drive roll 41 is lower than the running speed of the advanced selvage 57. Therefore, the motor 42 and the drive roll 41 perform a braking operation to correct the skew of the transverse web 28 by delaying the running of the advanced selvage 57. Alternatively, a braking device may be used instead of the motor 42 to delay the running of the advanced selvage in a similar manner. In this embodiment, the selvage 57 of the transverse web 28 is nipped between a pair of nip rolls wherein one of the nip rolls is braked by a frictional brake.

Also, both the selvages 57 of the transverse web 28 may be always nipped by both of the running speed control means 60, and the rotational speeds of the respective motors 42 are controlled to correct the skew.

In addition, while the respective running speed control means 60 has an exclusive motor 42 thereof in the above embodiment, a single motor may be provided and the speed of both the running speed control means 60 can be independently controlled via speed changing transmissions.

Also, the running speed control means 60 may be provided only on the side of one selvage 57 of the transverse web 28, and if the one selvage 57 is delayed relatively to the other, the running speed of the one selvage 57 is accelerated, and if the one selvage 57 is advanced relatively to the other, the running speed of the one selvage 57 is decelerated.

Also, the transverse web and the longitudinal web should not be limited to those disclosed in the above embodiment. That is, the transverse web may be a film of a sandwich type structure consisting of an intermediate layer of extensible thermoplastic resin (such as HDPE, PET or PP) and outer layers, disposed on the opposite sides of the intermediate layer, of adherent thermoplastic resin having a lower melting point than that of the former resin, which film is intermittently slitted in a staggered manner in the transverse direction except for the selvage portion; the slitted portion being then stretch in the widthwise direction. The longitudinal web may include; one formed of tape yarns arranged in parallel to each other, which tape yarns are prepared by slitting in the transverse direction and stretching a film consisting of an intermediate layer of extensible thermoplastic resin (such as HDPE, PET or PP) and outer layers, disposed on the opposite sides of the intermediate layer, of adherent thermoplastic resin having a lower melting point than that of the former resin; one prepared by splitting the above-mentioned film in the longitudinal direction after being stretched in the longitudinal direction, and then widening the same to a predetermined width; or one prepared by intermittently splitting the above-mentioned film in the longitudinal direction and then stretching the same in the longitudinal direction. Further, the transverse web may be one prepared by stretching a random nonwoven sheet in the transverse direction, except for opposite selvages thereof, to increase the transverse fibrous components. Similarly, the longitudinal web may be one prepared by stretching a random nonwoven sheet in the longitudinal direction to increase the longitudinal fibrous components.

Also, to draw, as a method for transversely stretching the transverse web in the transverse direction, a tenter which has been most widely used may be adopted, or a simple stretching machine such as one disclosed in Japanese Patent No. 1138234 may be used, which comprises the combination of a pair of pulleys and a belt.

While the fabrication of the transverse web and the longitudinal web and the lamination thereof are carried out in continuous steps in the above described embodiment, the transverse web and the longitudinal web may be separately prepared and then overlaid with each other later.

Figure 4:
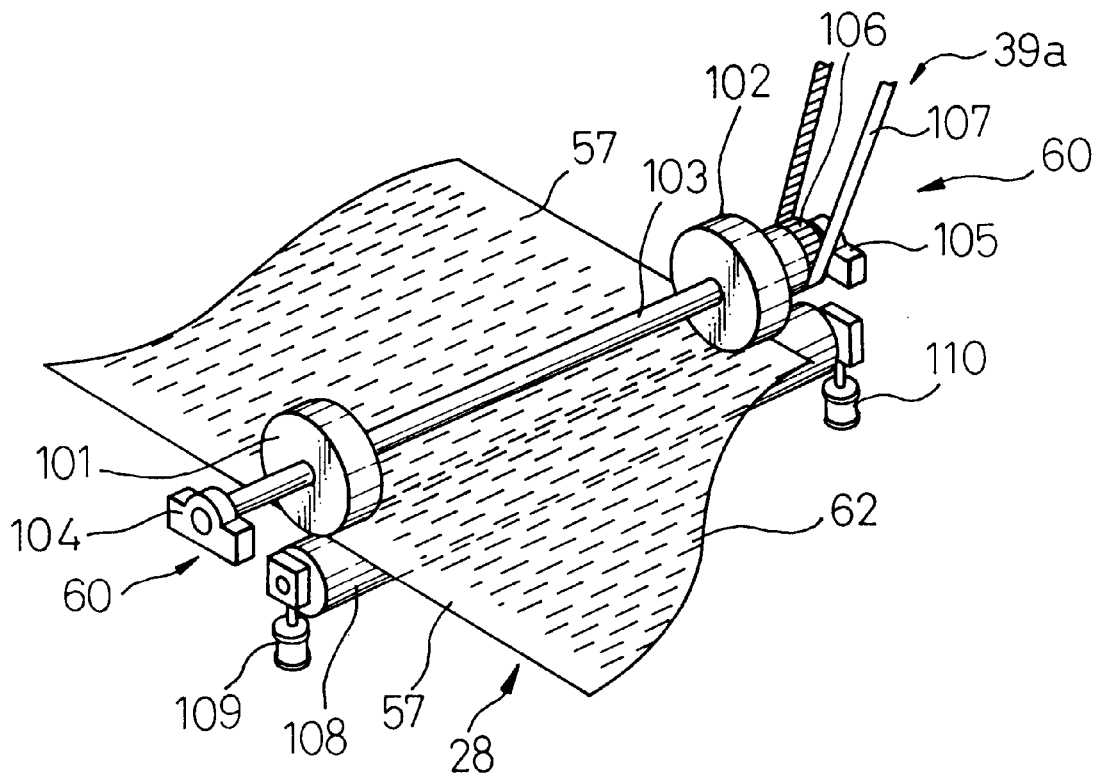
FIG. 4 is a perspective view of a skew correction device of a web lamination device according to the second embodiment of the present invention.

FIGS. 4 to 8 illustrate the second embodiment of the skew correction device in the web lamination device. The web lamination device has a laminating roll 29 and an introduction roll 30 similar to those shown in FIG. 1, wherein the longitudinal web 19 and the transverse web 28 are introduced between the laminating roll 29 and the introduction roll 30. In FIG. 4, a skew run-correction device 39a is provided, instead of the skew correction device 39 shown in FIG. 3, in a transportation path directly upstream of the laminating roll 29. The transverse web 28 is introduced between the laminating roll 29 and the introduction roll 30 while being tensioned in the transverse direction by cloth guiders 56 or the like, after the skew of the transverse web has been corrected by the skew correction device 39a.

The skew correction device 39a has running speed control means 60 capable of contacting opposite selvages 57 of the transverse web 28 and including drive rolls 101, 102. The drive rolls 101, 102 in this embodiment are mounted to a common shaft 103 rotatably held by bearings 104, 105. The shaft 103 is coupled via a pulley 106 and a belt 107 to a motor (not shown) and driven thereby. Accordingly, only one drive device is necessary for driving these elements.

An elongated common nip roll 108 is provided in association with both the drive rolls 101, 102 so that a left end portion of the common nip roll 108 confronts the lefthand drive roll 101, and a right end portion of the common nip roll 108 confronts the righthand drive roll 102.

Figure 5:
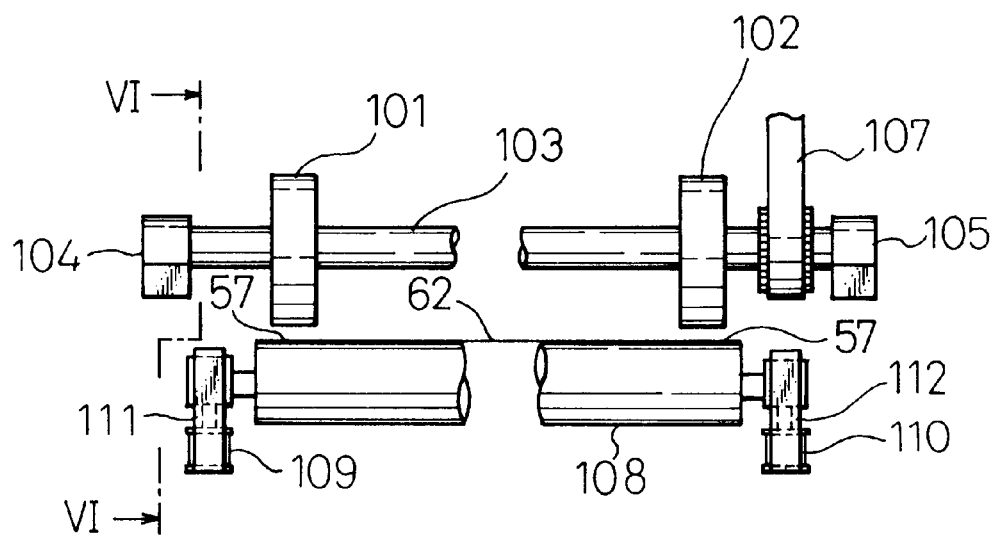
FIG. 5 is a front view of the skew correction device of FIG. 4.

As shown in FIG. 5, the left end of the common nip roll 108 is held by a piston rod 111 of a lefthand pneumatic cylinder 109, and the right end of the common nip roll 108 is held by a piston rod 112 of a righthand pneumatic cylinder 110. As illustrated FIG. 6, a frame 113 supports a rotary shaft of the common nip roll 108 in a slidable manner. Thus, the pneumatic cylinder 109 operates to move one end of the common nip roll 108 toward and away from the drive roll 101. On the other hand, the pneumatic cylinder 110 operates to move the other end of the common nip roll 108 toward and away from the drive roll 102.

Figure 6:
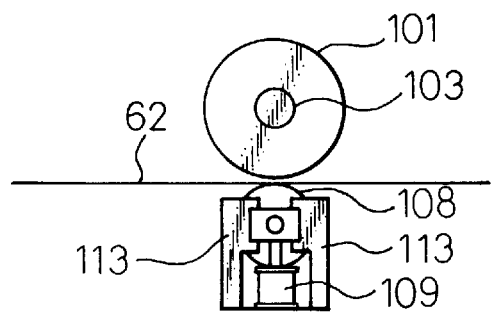
FIG. 6 is a cross-sectional view of the skew correction device of FIG. 4, taken along line VI—VI in FIG. 5.
Figure 7:
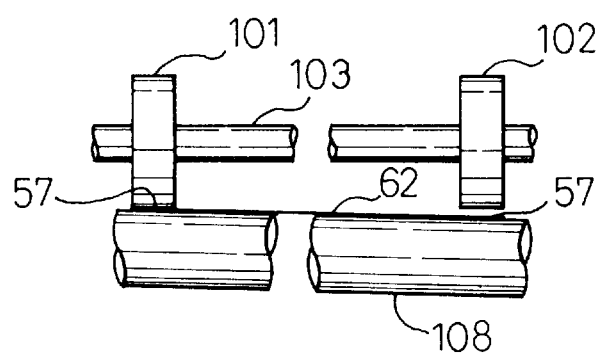
FIG. 7 illustrates the use condition of the skew correction device in FIG. 4.
Figure 8:
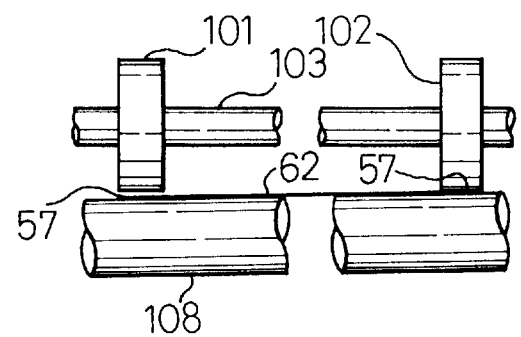
FIG. 8 illustrates another use condition of the skew correction device of FIG. 4.
Figure 9:
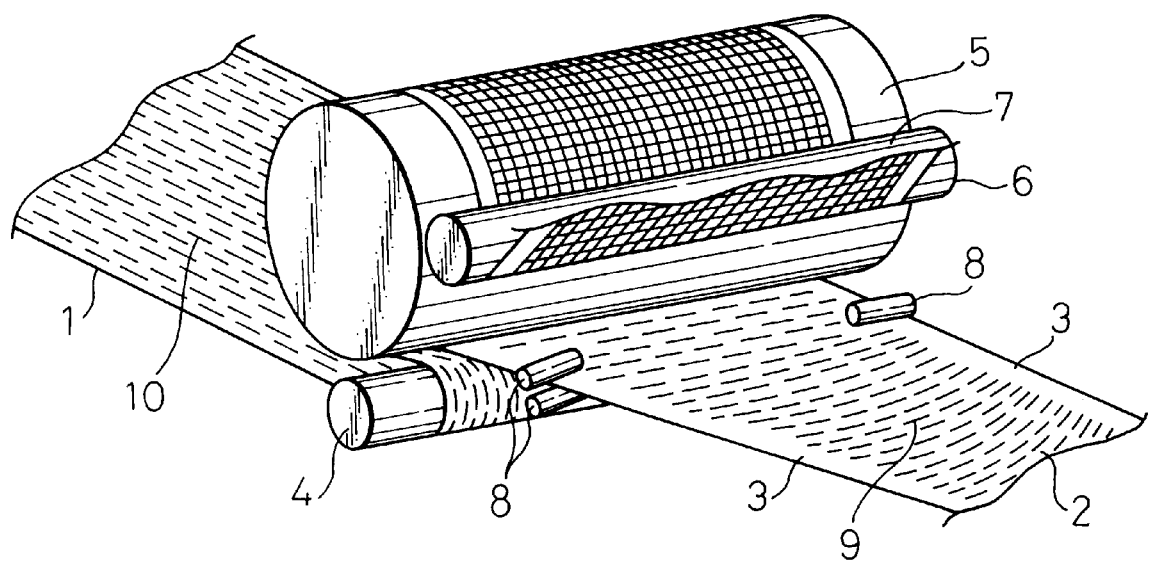
FIG. 9 is a perspective view of a prior art web lamination device.
Figure 10:
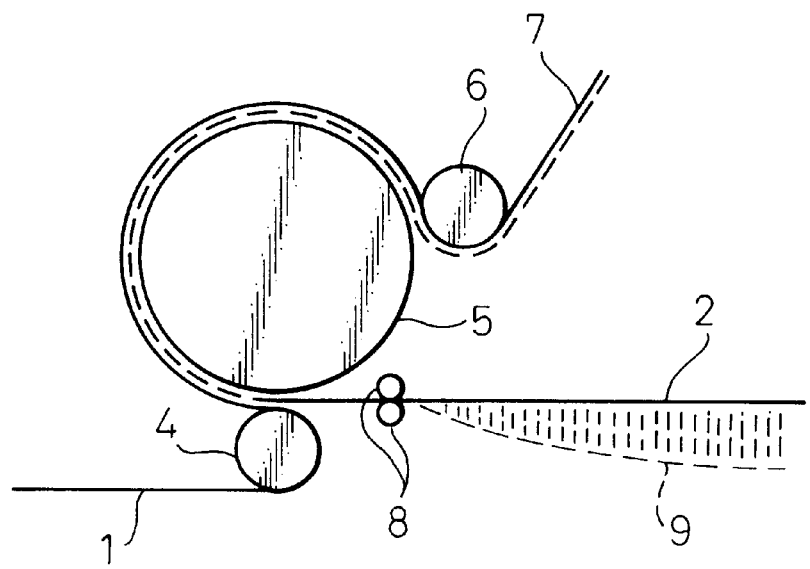
FIG. 10 illustrates the transverse fibrous elements of the transverse web in the slackened condition.
Figure 11:
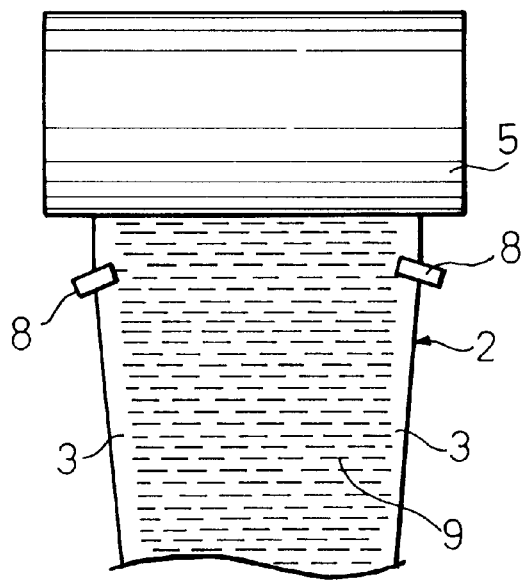
FIG. 11 is a plan view of the running transverse web.
Figure 12:
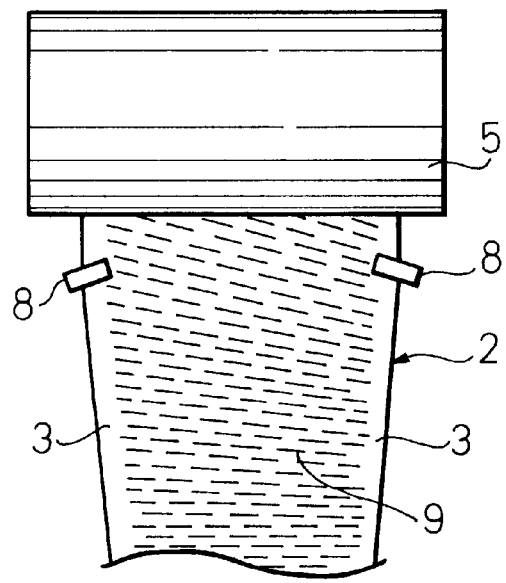
FIG. 12 is a plan view of the transverse web running in a skewed manner.

Also in this embodiment, when the correction of the skew is to be carried out, one of the pneumatic cylinders 110, 111 is operated so that the drive roll and the corresponding end of the nip roll are relatively moved toward each other (the nip roll is inclined in this instance) and thus to nip the selvage 57 of the transverse web 28 between the drive roll and the end of the nip roll so that the selvage 57 runs at the same speed as the peripheral speed of the drive roll (see FIGS. 7 and 8). When the correction of the skew of the transverse web 28 is not carried out, the drive roll and the associated end of the nip roll are relatively moved away from each other to release the transverse web 28 from the nip between the drive roll and the nip roll. When both the pneumatic cylinders 109, 110 are in the OFF condition, the transverse web 28 is not nipped at all, as shown in FIGS. 5 and 6. If the lefthand pneumatic cylinder 109 operates, the lefthand selvage 57 of the transverse web 28 is nipped, as shown in FIG. 7, and if the righthand pneumatic cylinder 110 operates, the righthand selvage 57 of the transverse web 28 is nipped, as shown in FIG. 8.

Also in this embodiment, the running speed of the delayed selvage 57 may be accelerated or that of the advanced selvage 57 may be decelerated, in a similar manner to the first embodiment.

As explained above, according to the present invention, it is possible to laminate a transverse web with a longitudinal web while maintaining the transverse fibrous elements, which are liable to skew, in the transverse direction as far as possible. Accordingly, it is possible to stabilize the product quality and improve the yield. Also, it is possible to largely improve the productivity, because it is not necessary to stop the production line for the purpose of machine adjustment.

I claim:

1. A web lamination device comprising a laminating roll for laminating a transverse web, having transverse fibrous elements extending generally transverse to the longitudinal conveying direction and opposite selvages, with a longitudinal web having longitudinal fibrous elements extending generally parallel to the longitudinal conveying direction, and skew correction means to be in contact with at least one of the selvages of the transverse web conveyed to the laminating roll at a predetermined speed for correcting skewing of the transverse web.

2. A web lamination device as defined by claim 1, wherein the skew correction means comprises a first running speed control means for controlling a running speed of one of the selvages of the transverse web and a second running speed control means for controlling a running speed of the other of the selvages of the transverse web.

3. A web lamination device as defined by claim 2, wherein the first and second running speed control means comprises first and second drive rolls capable of contacting the selvages of the transverse web, respectively.

4. A web lamination device as defined by claim 3, wherein a first nip roll is provided in association with the first drive roll and a second nip roll is provided in association with the second drive roll, and wherein a first actuator means is provided for relatively moving the first drive roll and the first nip roll toward and away from each other, and a second actuator means is provided for relatively moving the second drive roll and the second nip roll toward and away from each other.

5. A web lamination device as defined by claim 4, wherein, when the skew correction is carried out, each of the first and second actuator means operates to move the drive roll and the associated nip roll toward each other to nip the selvage of the transverse web between them so that the selvage runs at the same speed as the peripheral speed of the drive roll, and when no skew correction is carried out, each of the first and second actuator means operates to move the associated drive roll and nip roll away from each other to release the transverse web from the nip between the drive roll and the nip roll.

6. A web lamination device as defined by claim 5, wherein the first drive roll is driven by a first drive means, and a second drive roll is driven by a second drive means.

7. A web lamination device as defined by claim 3, wherein the first and second drive rolls are driven by a common drive means, and a common nip roll is provided for the first and second drive rolls so that one end portion of the common nip roll confronts the first drive roll and the other end portion of the common nip roll confronts the second drive roll, and wherein a first actuator means is provided for relatively moving the one end portion of the common nip roll and the first drive roll toward and away from each other, and a second actuator means is provided for relatively moving the other end portion of the common nip roll and the second drive roll toward and away from each other.

8. A web lamination device as defined by claim 7 wherein, when the skew correction is carried out, each of the first and second actuator means operates to move the drive roll and the associated end portion of the common nip roll toward each other to nip the selvage of the transverse web between them so that the selvage runs at the same speed as the peripheral speed of the drive roll, and wherein when no skew correction is carried out, the drive roll and the associated nip roll are moved away from each other to release the transverse web from the nip between the drive roll and the nip roll.

9. A web lamination device as defined by claim 1, wherein the skew correction means comprises a running speed control means for controlling a running speed of one of the selvages of the transverse web.

10. A web lamination device as defined by claim 9, wherein the running speed control means comprises a drive roll capable of accelerating or decelerating the running speed of one of the selvages of the transverse web relative to that of the other selvage.

11. A web lamination device as defined by claim 9, wherein the running speed control means is a braking means for braking the running of the selvage of the transverse web.

12. A web lamination device as defined by claim 2, wherein the first and second running speed control means are first and second braking means for braking the running of the selvages of the transverse web.

* * * * *